United States Patent
Dischler

(10) Patent No.: US 6,345,649 B1
(45) Date of Patent: Feb. 12, 2002

(54) BI-STABLE VALVE ESPECIALLY USEFUL FOR PRESSURIZING PEN REFILLS

(76) Inventor: Louis Dischler, 252 W. Park Dr. Duncan Park, Spartanburg, SC (US) 29306-5013

( * ) Notice: Subject to any disclaimer, the term of this patent is extended or adjusted under 35 U.S.C. 154(b) by 0 days.

(21) Appl. No.: 09/635,943

(22) Filed: Aug. 10, 2000

(51) Int. Cl.[7] ................................................. B65B 1/04
(52) U.S. Cl. ........................ 141/4; 141/20.5; 401/221; 137/859
(58) Field of Search ................................. 401/221, 222; 137/859; 141/2, 18, 20.5, 301, 285, 286, 4, 67

(56) References Cited

U.S. PATENT DOCUMENTS

| 3,079,946 A | * | 3/1963 | Rosler |
| 4,587,999 A | | 5/1986 | Boiko et al. |
| 4,712,583 A | * | 12/1987 | Pelmulder et al. |
| 5,738,459 A | | 4/1998 | Smith |
| 5,771,935 A | * | 6/1998 | Myers |

\* cited by examiner

Primary Examiner—Steven O. Douglas

(57) ABSTRACT

The present disclosure provides for a bi-stable valve especially useful for pressurizing pen refills. Pen refills so equipped may be inflated en masse in a pressure chamber, with a sudden drop in chamber pressure causing the bi-stable element to move from a valve open to a valve closed position.

17 Claims, 3 Drawing Sheets

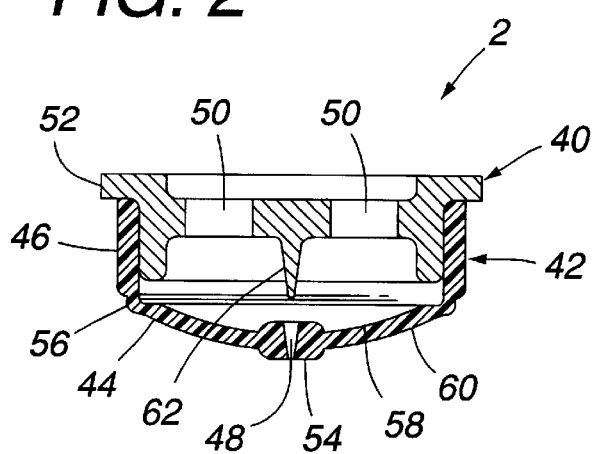
FIG. 1
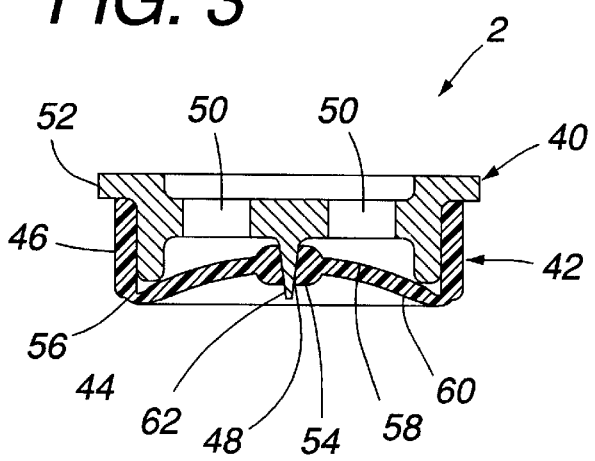
FIG. 2
FIG. 3
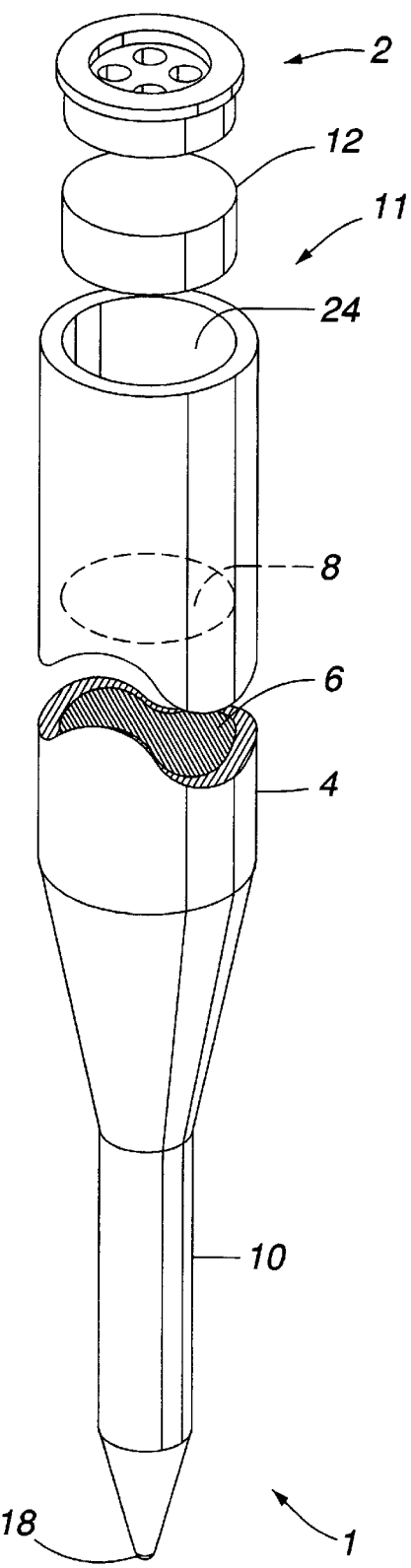

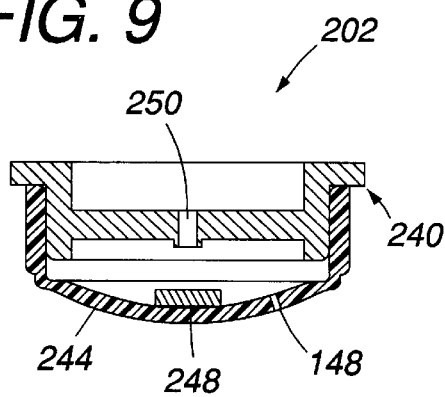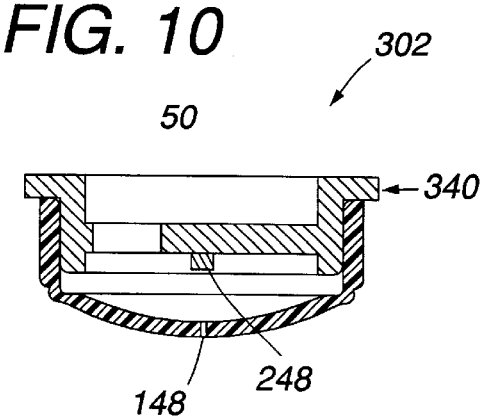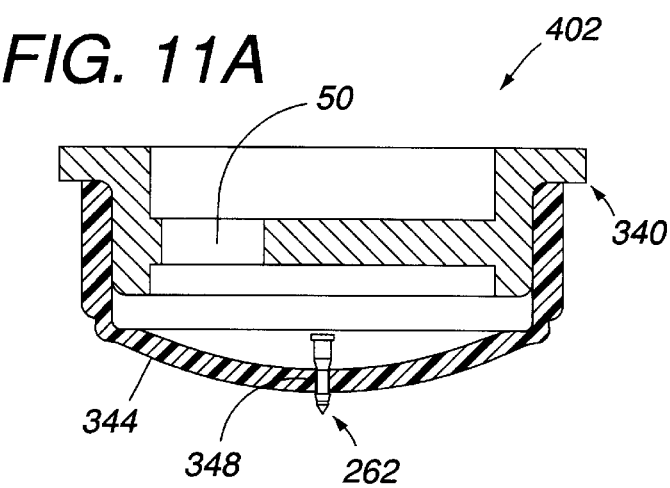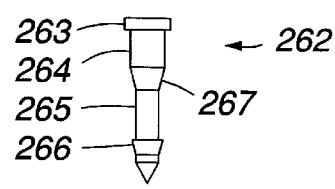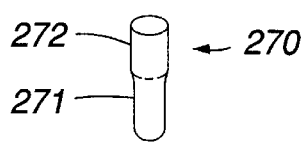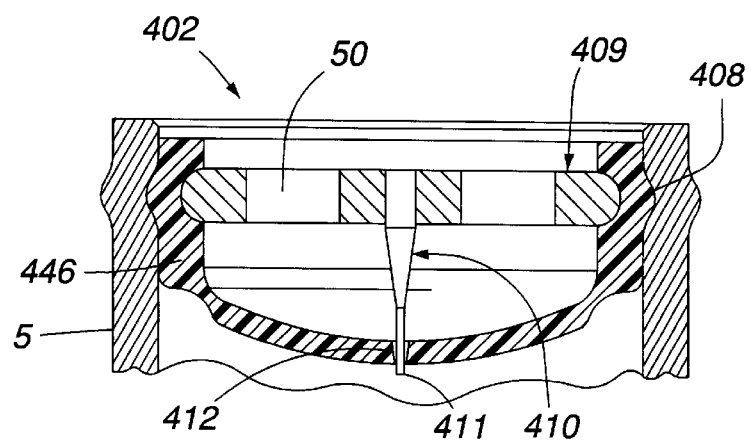

BI-STABLE VALVE ESPECIALLY USEFUL FOR PRESSURIZING PEN REFILLS

FIELD OF THE INVENTION

The present invention generally relates to a bi-stable valve especially useful for pressurizing pen refills. More specifically, the present invention relates to a normally open valve having a bi-stable element, wherein a sudden loss of pressure from one port causes the valve to close, generally irreversibly.

BACKGROUND OF THE INVENTION

Writing instruments such as pens are commonly provided with a cartridge or a refill such that, when the ink within the pen or refill is fully depleted, only the refill requires replacement. As a result, a variety of decorative pen housings can be provided to receive a standard refill so that the housing can be used repeatedly, requiring replacement of the refill only.

Refills may be pressurized, whereby a smooth and continuous flow of ink is produced regardless of the orientation of the pen itself. For a disposable product, it is preferable that the refill be supplied to the end user pressurized, without subsequent repressurization being necessary.

Pressurization may be achieved by providing chemicals within the refill that react over time, creating gas reaction products that maintain the pressure of the sealed refill tube. This is relatively complicated, expensive and imprecise.

Another method of pressurizing a refill involves pushing a stopper into the open proximal end of the ink tube, whereby the air between the end of the ink column and the stopper is compressed. With this method, the amount of ink that may be loaded into the ink tube is limited, because a portion of the volume, which is needed to compress the column of air, is lost as storage space for the ink.

Yet another method of introducing gas into a refill employs a valve pressed into the proximal end of the ink tube. For example, in the minimal configuration the valve employs one seal (U.S. Pat. No. 4,587,999, to Boiko, et al.), or three or more in a more complex configuration (U.S. Pat. No. 5,738,459 to Smith). Such valves necessarily must have low sealing forces, as the small size of the valve limits the size of springs or other elements employed to close the valve. Imperfections or contaminants on the sealing surfaces may thereby result in loss of pressurization.

A need, therefore, exists for an inexpensive and reliable valve capable of generating high sealing forces that also provides for self-actuated closure.

SUMMARY OF THE INVENTION

The present invention provides an initially open valve assembly having an inlet (proximal end) and an outlet (distal end) and a bi-stable element therebetween that closes the valve upon sudden reduction of inlet pressure. In a preferred embodiment, the valve assembly is used in a pen refill.

The bi-stable element has an open mode, whereby fluid, particularly gaseous fluid is allowed to flow therethrough, and a closed mode wherein fluid flow therethrough is blocked. The bi-stable element is preferably a curved disk molded in the closed mode shape from an elastomeric or polymeric material. The valve assembly may be pressed into the proximal end of the tubular ink reservoir of a refill, with the valve in the initially open mode. Once the reservoir is pressurized, inlet pressure may be rapidly reduced, causing the disk to become unstable and invert. The force generated by the inversion of the disk is used to assist the closure of the valve.

The valve assembly comprises at least one distal port and at least one proximal port. An inner support serves to enhance the sealing of an annular ring seal against the inner surface of ink reservoir, to carry the at least one proximal (inlet) port, and, optionally, a sealing plug or other element for sealing the at least one distal port. The bi-stable element comprises means for closing the valve, and generally also comprises at least one distal (outlet) port for allowing fluid passage into the body of the refill. The bi-stable element preferably comprises a curved disk, which may have varying thickness, and which may optionally have a thickened central area (boss) for enhancing the sealing of a proximal port penetrating the disk at that point. The disk may optionally carry a plug or other means for sealing the proximal port. The periphery of the disk, forming a continuous seal to the annular ring, is preferably reduced in thickness to allow for inversion of the disk. It is preferred that, given a flow rate, the pressure drop across the proximal port is greater than that across the distal port, so that the bi-stable element may be quickly actuated with minimal loss of refill pressure.

It is an object of the present invention, therefore, to provide a bi-stable valve element.

It is another object of the invention to provide a bi-stable valve for pen refills, whereby the valve is automatically closed upon the release of inlet pressure.

It is another object of one embodiment of the invention to provide an irreversible valve closure.

It is another object of one embodiment of the invention to provide visual indication of valve closure in a valve having a bi-stable element.

It is another object of the invention to provide a curved disk for use as a bi-stable element in a valve.

BRIEF DESCRIPTION OF THE DRAWINGS

The above as well as other objects of the invention will become more apparent from the following detailed description of the preferred embodiments of the invention, when taken together with the accompanying drawings in which:

FIG. 1 is an exploded perspective view of a pen refill according to one embodiment of the invention.

FIG. 2 is a cross-sectional view of a valve assembly according to one embodiment of the invention, wherein the valve is in the open mode.

FIG. 3 is a cross-sectional view of the valve shown in FIG. 2, wherein the valve is in the closed mode.

FIG. 9 is a cross-sectional view of a valve assembly in the open mode, according to another embodiment of the invention, wherein a resilient pad is substituted for a plug.

FIG. 10 is a cross-sectional view of a valve assembly in the open mode, according to yet another embodiment of the invention, wherein a resilient pad is substituted for a plug.

FIG. 11A is a cross-sectional view of a valve assembly in the open mode, according to another embodiment of the invention, comprising a projectile plug for sealing.

FIG. 11B is an enlarged side view of a projectile plug for sealing, as shown in FIG. 11A.

FIG. 11C is a perspective view of an alternative projectile plug for use in the valve assembly shown in FIG. 11A.

FIG. 12 is a cross-sectional view of a valve assembly in the open mode, according to another embodiment of the invention, wherein the valve is retained by a groove in the refill tube.

DETAILED DESCRIPTION OF THE PRESENTLY PREFERRED EMBODIMENTS

Figure 4:
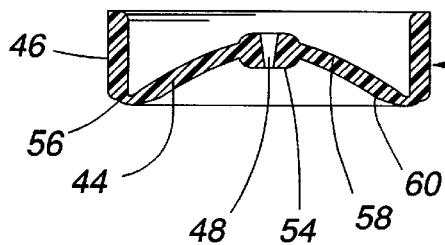
FIG. 4 is a cross-sectional view of a bi-stable element as shown in FIG. 3.

Referring now to the drawings wherein like numerals refer to like parts, FIG. 1 illustrates a refill 1 having an interior volume defined by a tube 4 partially filled with ink 6 having an upper surface 8, whereupon the upper surface 8 may optionally comprise a follower and/or grease plug (not shown). The tube 4 is substantially and uniformly cylindrical along its length and tapers toward its distal end 10, where it terminates in a writing tip 18, such as a ballpoint. At the proximal end 11 of the tube 4 is an opening 24 through which a valve assembly 2 can be inserted. Below the valve assembly is an optional grease plug 12. The volume between the optional grease plug 12 and the upper surface 8 is filled with a pressurized gas. The gas is pressurized to maintain a constant and continuous pressure on the upper surface 8 such that the ink 6 evenly and continuously flows through the writing tip 18 when the refill 1 is used, for example, within a pen housing (not shown).

A preferred embodiment of the valve assembly 2 is shown in FIG. 2 in the open stable mode, and in FIG. 3 in the closed stable mode. The assembly comprises inner support 40 and bi-stable element 42. The inner support 40 comprises ports 50, plug 62, and lip 52. The bi-stable element 42 comprises annular ring 46, annular neck, 56, curved disk 44, and boss 54. A tapered port 48 is located in boss 54. In FIG. 2, gas (and/or liquid, if desired) enters ports 50, and then enters tube 4 (not shown) by way of tapered port 48. If the supply gas pressure feeding ports 50 is suddenly dropped to a level sufficiently below that within the pressurized tube 4 (FIG. 1), then the curved disk 44 inverts. When inverted, the upper surface 58, shown as concave in FIG. 2, becomes convex in the closed mode shown in FIG. 3. Similarly, the lower surface 60, shown as convex in FIG. 2, becomes concave in the closed mode. If, as preferred, the bi-stable element is molded in a substantially closed configuration (shown in FIGS. 3 and 4), then the energy recovered in snapping from the open stable mode (FIG. 2) to the closed stable mode (FIG. 3) accelerates the boss 54, forcing the plug 62 into the tapered port 48 with a force which adds to that of the force generated by the differential gas pressure across the curved disk 44. If the bi-stable element 42 is molded in the open position, the snap action will still exist, however the force generated will be less.

Figure 5:
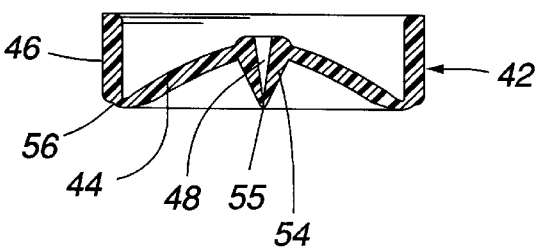
FIG. 5 is a cross-sectional view of a bi-stable element according to another embodiment of the invention, wherein the element is in the closed mode.

Turning now to FIG. 5, the tapered port 48 is shown in an alternative embodiment to taper to essentially zero diameter. This may be achieved if the boss is comprised of a resilient material (elastomer or rubber), and the lower part of the tapered port 48 is completed by piercing, so that no material is removed. This pierced port section 55 acts as a check valve during the short period of inversion of the disk 44, so that the pressure loss during inversion is minimized.

Figure 6:
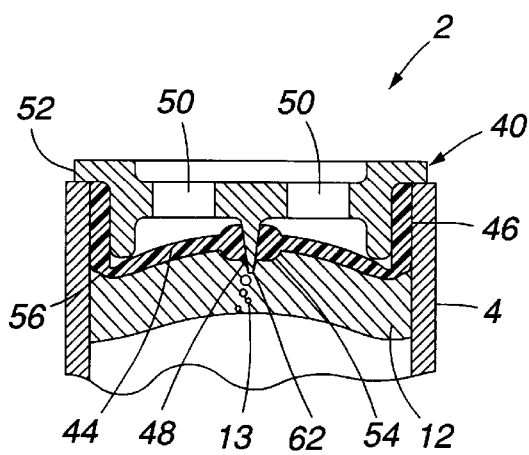
FIG. 6 is a cross-sectional view of a valve assembly and grease plug contained within the proximal end of a pen refill according to one embodiment of the invention, wherein the valve is in the closed mode.

If a grease plug 12, as shown in FIG. 6, is installed directly below boss 54, gas can be expected to channel through the plug 12, with the gas channel 13 breaking up during the acceleration brought about by inversion of the bi-stable element 44, so that there is no direct passageway for gas to escape back through the port 48. The grease plug serves essentially the same purpose in all of the embodiments of the invention, and further can serve to improve the sealing of the annular ring 46 to the internal diameter of the tube 4.

Figure 7:
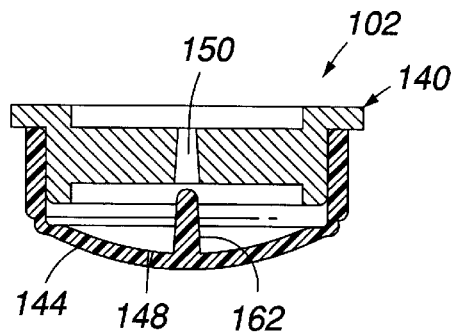
FIG. 7 is a cross-sectional view of a valve assembly in the open mode, according to another embodiment of the invention, wherein the bi-stable element carries a plug.
Figure 8:
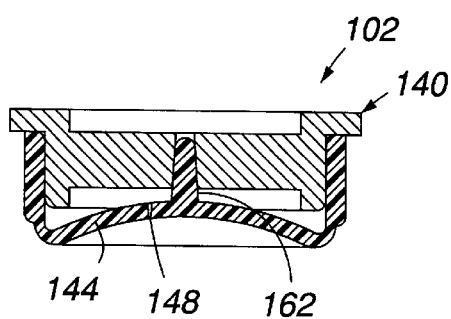
FIG. 8 is a cross-sectional view of a valve assembly as shown in FIG. 7, wherein the valve is in the closed mode.

Turning now to FIGS. 7 and 8, an alternative embodiment of the valve assembly 102 is shown in the open and closed modes, respectively. The curved disk 144 caries sealing plug 162 on its upper surface. Sealing plug seals proximal port 150 in inner support 140, when in the closed mode. A smaller distal port 148 is penetrates curved disk 144. The presence of plug 162 in proximal port 150 provides a visual indication that the valve is in the closed position.

In FIG. 9, an alternative embodiment of the valve assembly 202 is shown in the open mode, wherein sealing of the proximal port 250 in inner support 240 is effected by pressure contact with resilient cushion 248, when the curved disk 244, penetrated by the smaller distal port 148, is inverted.

In FIG. 10, another alternative embodiment of the valve assembly 302 is shown in the open mode, wherein sealing of the smaller distal port 148 is accomplished by pressure contact with resilient cushion 248 attached to the lower surface of inner support 340.

Sealing by way of a projectile plug 262 is shown in FIG. 11A, wherein the valve assembly 402 is in the open mode. The plug 262, enlarged in FIG. 11B, is shown to comprise a barbed tip 266 for loose retention of the plug in the open mode, a narrow diameter 265 to allow passage of gas in the open mode, a taper 267, a larger sealing diameter 264, and a head 263. When the curved disk 344 (FIG. 11A) inverts, the head impacts the lower surface of inner support 340, driving the plug into the distal port 348 so that the larger sealing diameter 264, larger than the distal port 348 diameter, seals off the pressure contained within the refill.

In FIG. 11C, an alternative projectile plug 270 is shown, comprising larger sealing diameter 272, and flattened section 271, where the flattened section allows retention by the distal port 348 (FIG. 11A) while also allowing gas blow-by in the open mode.

In FIG. 12, an embodiment is shown wherein a groove 408 in the internal diameter of the refill tube 5 serves to retain the annular ring 446 of the bi-stable assembly 402. The inner support 409 comprises a disk having proximal ports 50, and a separate partially tapered plug 410 mounted on its lower surface. The plug has a guide extension 411; to insure that the distal port 412 is properly oriented to the plug. Said extension may be used with any of the embodiments.

While the refills may be pressurized individually, it is preferred that they be pressurized en masse by placing a plurality of refills in a pressure chamber (not shown), pressurizing the chamber with a gas to a pressure higher than required (to allow for loss through the distal port during inversion of the bi-stable element, and for the increase in internal pressurized refill volume brought about by the inversion), allowing the gas pressure to build up in the refills, and then dropping the chamber pressure at a rate sufficient to invert the bi-stable elements within the refills, followed by removal of the refills from the chamber.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

I claim:

1. A valve for insertion into a tube having an internal diameter, comprising:
   a tubular valve body having an outside diameter, a proximal port for fluid entry, and a distal port in fluid communication with said proximal port;
   a bi-stable element sealed to said tubular valve body, said bi-stable element having a stable open mode and a stable closed mode; and
   means for blocking said fluid communication between said proximal port and said distal port when said bi-stable element is in said stable closed mode, wherein said means for blocking said fluid communication between said proximal port and said distal port comprises a plug sealably engageable with said distal port and/or said proximal port when said bi-stable element is in said stable closed mode.

2. A valve for insertion into a tube having an internal diameter, as recited in claim 1, wherein said plug is a grease plug in contact with said distal port.

3. A valve for insertion into a tube having an internal diameter, as recited in claim 1, wherein said bi-stable element is an invertible curved disk.

4. A valve for insertion into a tube having an internal diameter, as recited in claim 3, wherein said distal port allows fluid communication through said invertible curved disk.

5. A valve for insertion into a tube having an internal diameter, as recited in claim 4, wherein said plug is a projectile plug.

6. A valve for insertion into a tube having an internal diameter, as recited in claim 5, said projectile plug sealably closing said distal port when the valve is in said stable closed mode.

7. A valve for insertion into a tube having an internal diameter, as recited in claim 1, said plug fixed to said tubular valve body and oriented towards said proximal port when said bi-stable element is in said open mode, and said plug sealably engaged to said proximal port when said bi-stable element is in said closed mode.

8. A valve for insertion into a tube having an internal diameter, as recited in claim 7, wherein said bi-stable element comprises an invertible curved disk.

9. A valve for insertion into a tube having an internal diameter, as recited in claim 1, said plug fixed to said bi-stable element and oriented towards said proximal port when said curved disk is in said open mode, and said plug sealably engaged to said proximal port when said curved disk is in said closed mode.

10. A valve for insertion into a tube having an internal diameter, as recited in claim 9, wherein said bi-stable element comprises an invertible curved disk.

11. A valve for insertion into a tube having an internal diameter, as recited in claim 1, wherein said bi-stable element is an invertible curved disk, and wherein said distal port allows fluid communication through said invertible curved disk.

12. A valve for insertion into a tube having an internal diameter, as recited in claim 1, said means for blocking, further comprising a compliant pad.

13. A valve for a pen refill having a volume, comprising:
    a tubular body having a distal end and a proximal end, said proximal end having a proximal port for the entry of a gaseous fluid;
    an invertible curved disk having a convex side, a concave side, and a periphery, said disk sealed to said tubular body about said periphery, said invertible curved disk having a distal port for passing said gaseous fluid from said proximal port to the pen refill volume; and
    a plug oriented between said proximal port and said distal port, said plug sealably engageable with said proximal port and/or said distal port upon inversion of said curved disk.

14. A valve for a pen refill having a volume, as recited in claim 13, further comprising a grease plug in contact with said distal port.

15. A valve for a pen refill having a volume, as recited in claim 13, said plug sealably engageable with only said proximal port upon inversion of said curved disk.

16. A valve for a pen refill having a volume, as recited in claim 13, said plug sealably engageable with only said distal port upon inversion of said curved disk.

17. A bi-stable element for use in a valve for a pen refill, comprising:
    an invertible curved disk having a periphery, said disk having a port therein for fluid movement therethrough;
    an annular ring; and
    an annular neck forming a continuous connection between said annular ring and said periphery of said invertible curved disk.

* * * * *